(12) United States Patent
Hamzeh et al.

(10) Patent No.: US 11,818,575 B2
(45) Date of Patent: Nov. 14, 2023

(54) SYSTEMS AND METHODS FOR VIRTUAL PERSONAL WI-FI NETWORK

(71) Applicant: CABLE TELEVISION LABORATORIES, INC, Louisville, CO (US)

(72) Inventors: Belal Hamzeh, Westminster, CO (US); Bernardo Huberman, Palo Alto, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 18/088,720

(22) Filed: Dec. 26, 2022

(65) Prior Publication Data
US 2023/0130053 A1    Apr. 27, 2023

Related U.S. Application Data

(62) Division of application No. 16/271,683, filed on Feb. 8, 2019, now Pat. No. 11,540,129.

(Continued)

(51) Int. Cl.
| | |
|---|---|
| *H04L 29/06* | (2006.01) |
| *H04L 29/08* | (2006.01) |
| *H04W 12/08* | (2021.01) |
| *H04W 76/11* | (2018.01) |
| *H04L 9/40* | (2022.01) |
| *H04W 12/04* | (2021.01) |
| *H04W 12/033* | (2021.01) |
| *H04W 12/73* | (2021.01) |
| *H04W 12/06* | (2021.01) |
| *H04W 84/12* | (2009.01) |

(52) U.S. Cl.
CPC ......... *H04W 12/08* (2013.01); *H04L 63/0272* (2013.01); *H04W 12/033* (2021.01); *H04W 12/04* (2013.01); *H04W 12/73* (2021.01); *H04W 76/11* (2018.02); *H04W 84/12* (2013.01)

(58) Field of Classification Search
CPC ... H04W 12/08; H04W 12/033; H04W 76/11; H04W 12/04; H04W 12/73; H04W 76/14; H04W 88/04; H04W 84/12; H04L 63/0272
USPC .......................................................... 726/15
See application file for complete search history.

(56) References Cited

U.S. PATENT DOCUMENTS 9,553,849 B1 *   1/2017   Smalley ................ G06F 21/554
10,037,682 B1 *  7/2018   Shah .................. G08B 21/0272
(Continued)

*Primary Examiner* — Haresh N Patel
(74) *Attorney, Agent, or Firm* — David Daniel Smith

(57) ABSTRACT

A wireless communication network includes a plurality of first electronic devices configured for wireless communication, at least one second electronic device configured for wireless communication, and at least one access point configured to wirelessly receive client data from, and transmit network data to, the plurality of first electronic devices and the at least one second electronic device. The wireless communication network further includes a virtual private wireless communication sub-network that includes the plurality of first electronic devices and excludes the at least one second electronic device. The virtual private wireless communication sub-network is configured to enable each of the plurality of first electronic devices to automatically connect with the wireless communication network.

7 Claims, 2 Drawing Sheets

Related U.S. Application Data

(60) Provisional application No. 62/628,246, filed on Feb. 8, 2018.

(56) References Cited

U.S. PATENT DOCUMENTS

| | | | | |
|---|---|---|---|---|
| 10,057,813 B1* | 8/2018 | Likar | | H04L 63/0846 |
| 10,419,908 B1* | 9/2019 | Hutz | | H04W 4/50 |
| 2007/0115900 A1* | 5/2007 | Liang | | H04W 8/245 |
| | | | | 370/338 |
| 2010/0067406 A1* | 3/2010 | Suzuki | | H04W 48/16 |
| | | | | 370/254 |
| 2010/0082707 A1* | 4/2010 | Barbieri | | G16H 10/60 |
| | | | | 707/626 |
| 2010/0180016 A1* | 7/2010 | Bugwadia | | H04L 41/0856 |
| | | | | 713/168 |
| 2011/0105226 A1* | 5/2011 | Perlman | | H04L 65/765 |
| | | | | 463/30 |
| 2012/0233668 A1* | 9/2012 | Leafe | | G06F 9/44526 |
| | | | | 726/4 |
| 2013/0007848 A1* | 1/2013 | Chaskar | | G06F 21/554 |
| | | | | 726/4 |
| 2013/0028245 A1* | 1/2013 | Oerton | | H04W 4/00 |
| | | | | 455/456.1 |
| 2013/0054763 A1* | 2/2013 | Van der Merwe | | H04W 8/12 |
| | | | | 709/220 |
| 2014/0007209 A1* | 1/2014 | Zucker | | H04W 12/50 |
| | | | | 726/7 |
| 2014/0128102 A1* | 5/2014 | Fin | | H04W 48/08 |
| | | | | 455/456.3 |
| 2014/0376452 A1* | 12/2014 | Li | | H04L 67/55 |
| | | | | 370/328 |
| 2014/0379800 A1* | 12/2014 | Li | | G06F 16/903 |
| | | | | 709/204 |
| 2015/0263891 A1* | 9/2015 | Baugher | | H04L 49/15 |
| | | | | 370/254 |
| 2016/0373922 A1* | 12/2016 | Shanmugam | | H04W 4/24 |
| 2017/0048700 A1* | 2/2017 | Huang | | H04W 12/0431 |
| 2017/0086241 A1* | 3/2017 | Lopes | | H04L 41/0846 |
| 2017/0104625 A1* | 4/2017 | Chen | | H04L 67/10 |
| 2017/0160776 A1* | 6/2017 | Ahmed | | G06F 1/3212 |
| 2017/0164416 A1* | 6/2017 | Yeddala | | H04W 36/30 |
| 2017/0289159 A1* | 10/2017 | Adrangi | | H04W 12/02 |
| 2017/0347269 A1* | 11/2017 | Wu | | H04W 48/08 |
| 2017/0374692 A1* | 12/2017 | Currie | | H04W 24/02 |
| 2018/0014480 A1* | 1/2018 | Montgomery | | G05B 19/042 |
| 2018/0077022 A1* | 3/2018 | Van Oost | | H04L 63/0876 |
| 2018/0318716 A1* | 11/2018 | Benedetto | | A63F 13/31 |
| 2018/0338273 A1* | 11/2018 | Liu | | H04W 76/15 |
| 2019/0149532 A1* | 5/2019 | Newberg | | H04W 12/06 |
| | | | | 726/5 |
| 2019/0171725 A1* | 6/2019 | Shen | | G06Q 50/01 |
| 2019/0230019 A1* | 7/2019 | Jiang | | H04L 43/50 |
| 2019/0246277 A1* | 8/2019 | Hamzeh | | H04W 12/04 |
| 2020/0077248 A1* | 3/2020 | Åkesson et al. | | H04W 48/10 |
| 2020/0100171 A1* | 3/2020 | Uchikawa | | H04W 84/12 |
| 2020/0213936 A1* | 7/2020 | Fan | | H04W 88/08 |

\* cited by examiner

SYSTEMS AND METHODS FOR VIRTUAL PERSONAL WI-FI NETWORK

CROSS REFERENCE TO RELATED APPLICATIONS

This application claims the benefit of and priority to U.S. Provisional Patent Application No. 62/628,246, filed Feb. 8, 2018, now U.S. Pat. No. 11,540,129, the disclosure of which is incorporated by reference in its entirety.

BACKGROUND

The field of the disclosure relates generally to wireless network security, and more particularly, to the creation and implementation of secure virtual Wi-Fi networks and sub-networks.

A large amount of transactions performed over a network are not considered to be secure, and conventional transaction security solutions can be extremely complex. Moreover, conventional mechanisms for transaction security that may be considered secure at the present are likely to be considered less secure in the future as new exploitation techniques are discovered. Providing subscribers with reliable Wi-Fi coverage and capacity in a public environment become challenging when the associated Wi-Fi users are all given access to the same "secure" network environment.

Publicly accessible Wi-Fi networks typically include a plurality of access points (APs) in a wireless local area network (WLAN) configuration, which are managed by a WLAN Controller (WLC). The WLC manages the inter-AP radio frequency (RF) communication and coordination, typically in a vendor-proprietary manner. Conventional Wi-Fi networks are generally configured to allow communication between APs, clients, servers, stations (STAs), and/or other subscriber devices (e.g., 802.11-enabled user devices). Users of a Wi-Fi network are sometimes required to switch between the APs, such as in the case where a user device moves beyond a desired signaling range of a connected AP. Wi-Fi users are becoming increasingly more dependent on Wi-Fi connectivity in their daily lives. As this Wi-Fi dependence grows, and privacy and security of the individual users also becomes increasingly dependent on the security of the accessed Wi-Fi networks.

In general, the security of Wi-Fi networks has been improving significantly through the combination of better security systems on the Wi-Fi networks themselves, in combination with requiring users to get an access passphrase from the network operator of the Wi-Fi network (e.g., in a hotel, airport, coffee shop, airport lounge, other public venue, etc.). However, these recent improvements actually provide a false sense of security the individual users accessing the networks, due to the fact that essentially all of the users that are given access to the network are is using the same security key to access the network. This type of security system is analogous to placing a lock on the front door of a home, but providing a key to the lock to all visitors that come to the front door. The "security" provided by the lock becomes effectively irrelevant with respect to all of the other visitors who have "entered" the home. In other words, the security and privacy of a user device within a Wi-Fi network may be compromised by the other users of the same network.

Furthermore, as Wi-Fi-enabled devices become increasingly mobile, the need for an individual device to switch between different APs needs to occur more rapidly, seamlessly, and automatically. Security that may be established between a user device and a particular AP may not be effective if the user device switches to a different AP. Conventional Wi-Fi networks usually require that each user device, when connecting to the Wi-Fi network, must individually establish a connection with the network, which is typically a manual connection process. A traveling family of four individuals, for example, might each have two separate Wi-Fi-enabled devices (e.g., a smart phone and a computer/tablet), and the task of manually connecting all eight devices to a new Wi-Fi network is cumbersome. This process becomes even more cumbersome each time a new Wi-Fi network is encountered (e.g., such as in the case of traveling from an airport to hotel).

Accordingly, it is desirable to provide a system that can provide actual security to a device, or family of devices, separate from the false sense of security associated with conventional "secure" Wi-Fi networks. Additionally, it is desirable to enable individual devices to avoid the manual process of connecting each device to a new Wi-Fi network.

SUMMARY

In an embodiment, a wireless communication network includes a plurality of first electronic devices configured for wireless communication, at least one second electronic device configured for wireless communication, and at least one access point configured to wirelessly receive client data from, and transmit network data to, the plurality of first electronic devices and the at least one second electronic device. The wireless communication network further includes a virtual private wireless communication sub-network that includes the plurality of first electronic devices and excludes the at least one second electronic device. The virtual private wireless communication sub-network is configured to enable each of the plurality of first electronic devices to automatically connect with the wireless communication network.

In an embodiment, a method of implementing a virtual private wireless network within a wireless communication network is provided. The method is implemented by a first Wi-Fi-enabled device having a processor and memory. The method includes steps of storing a user-defined service set identifier and a user-defined security key in the memory, scanning for one or more wireless networks that support of the virtual private wireless network, identifying the wireless communication network from among the one or more wireless networks, transmitting the user-defined service set identifier and the user-defined security key to the wireless communication network, instructing the wireless network to enable the user-defined service set identifier and the user-defined security key at a target access point configured to wirelessly communicate according to a communication protocol of the first Wi-Fi-enabled device, pushing the user-defined service set identifier and the user-defined security key to a second Wi-Fi-enabled device associated with a user of the first Wi-Fi-enabled device, authorizing the second Wi-Fi-enabled device to automatically discover the user-defined service set identifier and the user-defined security key enabled at the target access point.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
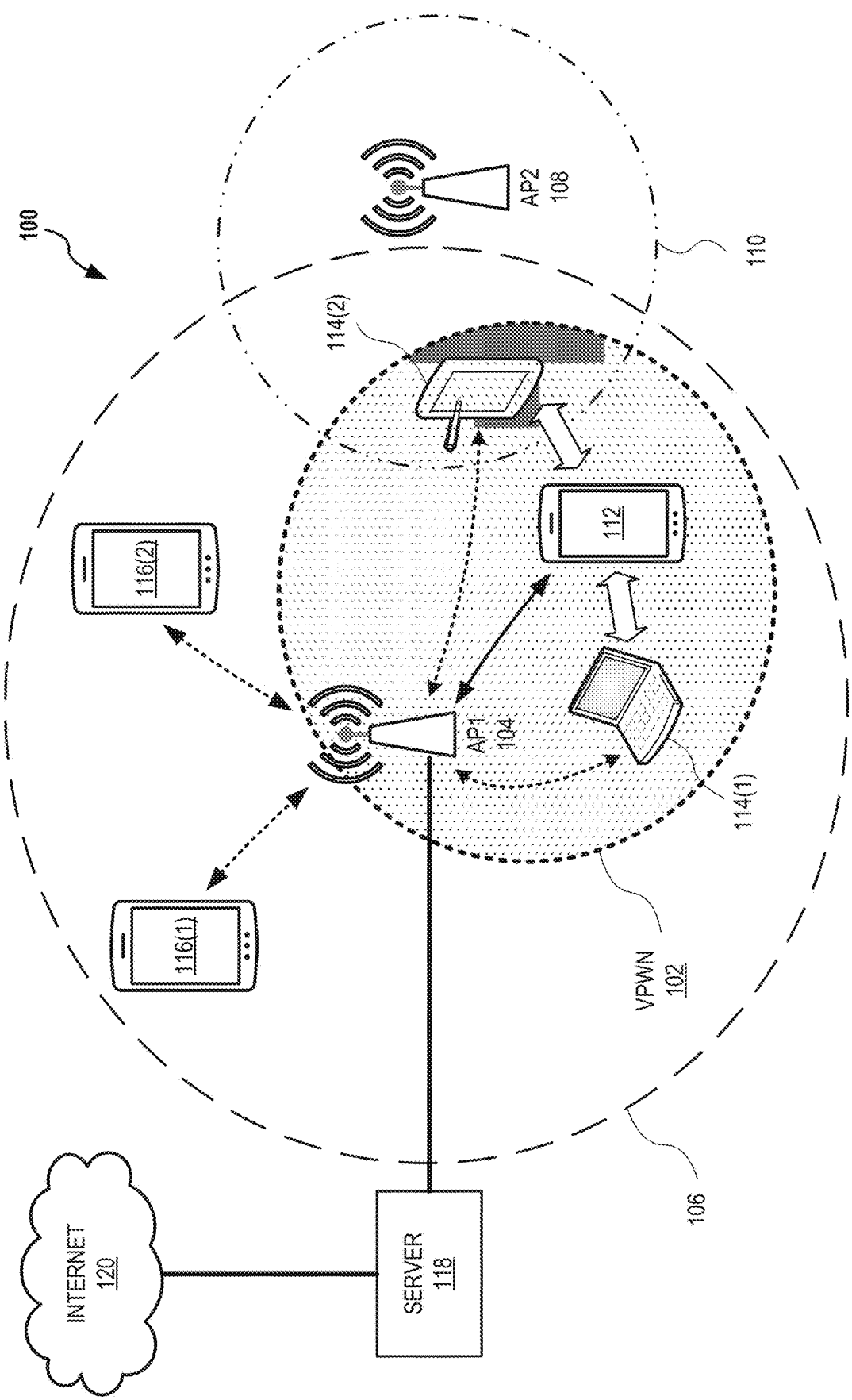
FIG. 1 is a schematic illustration of a Wi-Fi network, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, software applications, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "Wi-Fi device" refers to an electronic device, such as a station (or STA), that has the capability to access and implement one or more existing IEEE 802.11 protocols. For example, a Wi-Fi device may include, without limitation, a mobile handset or similar device, one or more of a laptop, a desktop personal computer (PC), personal digital assistant (PDA), AP, and a Wi-Fi phone/smartphone. A Wi-Fi device may be fixed, mobile, or portable, and includes a transceiver or transmitter/receiver combination. A Wi-Fi device may be separate from or integrated with user equipment configured to implement other wireless technology protocols such as long term evolution (LTE) and/or IEEE 802.16, and may include a media access control (MAC) and physical layer (PHY) interface that is both 802.11-conformant and 802.16-conformant to a wireless medium.

As used herein, "SSID" stands for "Service Set Identifier," and refers to a primary name associated with an 802.11 WLAN, such as a home network or public hotspot. An SSID may be a unique ID of up to 32 characters, and is used for naming wireless networks. The SSID may be according to the WPA2 wireless security standard, and functions to ensure that data and data packets are sent to the correct destination, and typically in the case of multiple wireless networks overlapping in a particular geographic location.

The present systems and methods enable an individual user to establish the user's own user-defined SSID and security keys to provide to a Wi-Fi network operator (e.g., an MNO, etc.), and these user-defined elements will thereby enable all associated user devices to automatically connect to a new Wi-Fi network without the need for additional manual user input. The same security key may be shared with specified user devices, but will not be available or visible to other users or subscribers about the same Wi-Fi network (or access point therein), even if the user-defined SSID is visible/detected.

Thus, the following description distinguishes between a user-defined SSID, on the one hand, and a network-defined SSID, on the other hand. That is, the network-defined SSID generally refers to the name of a Wi-Fi network, and is most often encountered by a user when a user is using a Wi-Fi-enabled mobile device to connect to a wireless network. Each packet sent over the wireless network will include the network-defined SSID to ensure that the transmitted wireless data arrives at the correct location. When looking to join a wireless network from a Wi-Fi device (e.g., smartphone, laptop, tablet), users are typically presented with a list of network-defined SSIDs from which to select. These network-defined SSIDs may be default labels given to the network by a manufacturer, or may be customized names (e.g., "AIRPORT_WI-FI_1234") created by the network operator after-the-fact. Network-defined SSIDs may be often changed by the network operator, such as through access to administrator settings in a router or similar device.

Network-defined SSIDs are normally provided as part of the set-up materials for a router, and usually require a separate wireless access password to access the wireless network thereof. The network-defined SSID and wireless access password are different from the administrator username and administrator password of the network operator to access the router's administrator console, which grants access to network data and options for configuring settings, including the network-defined SSID.

Wireless devices use network-defined SSID to connect to the internet by scanning for networks with which the particular device may wirelessly connect. Upon scanning, the device will typically be presented with a list of available, non-hidden networks (i.e., the network-defined SSIDs). Some networks may further include an icon (e.g., a padlock symbol) that indicates whether (i) the network is open to all users, or (ii) the network is private and "secure," namely, requires a password to access the network. As described above, conventional private networks typically provide the same password to all users thereof. Hidden network-defined SSIDs are often discoverable by software applications designed to uncover hidden networks, and similar software applications running within a private network may compromise the security of other devices communicating data within that private network. These vulnerabilities are significantly avoided according to the present techniques that establish an effective virtual private Wi-Fi subnetwork (VPWN) within the existing paradigm of secure (or even un-secure) Wi-Fi networks.

FIG. 1 is a schematic illustration of a Wi-Fi network 100. In the exemplary embodiment, VPWN 102 is configured to operate within Wi-Fi network 100. In an exemplary embodiment, Wi-Fi network 100 is a wide area network (WAN), such as that associated with an Internet service provider (ISP) or a multiple system operator (MSO) includes a first AP 104 (AP1) forming a first transmission zone 106, and a second AP 108 (AP2) forming a second transmission zone 110. In the exemplary embodiment, a primary Wi-Fi device 112 of a first user/client (not shown) is operable within first transmission zone 106 of first AP 104. In the example depicted in FIG. 1, one or more associated secondary Wi-Fi devices 114 (e.g., Wi-Fi-enabled laptop 114(1), Wi-Fi-enabled tablet 114(2)) of the first user/client, as well as a plurality of non-associated client devices 116, are operable to wirelessly communicate within first transmission zone 106 and second transmission zone 110 of Wi-Fi network 100.

In this example, two APs are shown for simplicity of explanation. However, a person of ordinary skill in the art will understand how the principles of the present embodiments are operable with respect to only a single AP, and/or with respect to a plurality of APs significantly greater than two. Signaling between first AP 104 and second AP 108 may facilitate the wireless exchange of client data with Wi-Fi devices 112, 114, 116. In some embodiments, the client data may be communicated between APs 104, 108 over a local area network (LAN) established between the APs, which may be wired (not shown) or wireless (such as in the case of overlap between zones 106, 110), such as a backhaul network. In some embodiments, the wired portion of the LAN enables communication between first AP 104 and second AP 108, whereas the wireless portion of the LAN enables communication between devices 112, 114, 116 and one or more of APs 104, 108. In at least one embodiment, Wi-Fi network 100 may be partitioned into virtual LANs (VLANs), which constitute a group, or groups, of devices on one or more LANs that are configured to communicate as if the grouped devices were attached to the same wire, even if actually located on different LAN segments. That is, VLAN groupings/connections are logical, as opposed to physical.

In at least one embodiment, Wi-Fi network 100 further includes a server 118 in operable communication with at least one of APs 104, 108. In the exemplary embodiment depicted in FIG. 1, first AP 104 (AP1) is shown to also be acting as a gateway (GW) with second AP 108 (AP2), and a server 118 is shown to be operably connected downstream from first AP 104. In this particular configuration, wireless data, information, or messaging from devices 112, 114, 116 (collectively referred to as "client data") may be exchanged over the WAN of Wi-Fi network 100 such that the client data may be required to pass through first AP 104 such that AP1 may be considered as the last link, or "hop," between the WAN and the APs before reaching server 118, which may then exchange the received client data with a broader electronic network 120, such as the Internet. In some embodiments, each AP may include its own processor and memory device, and may be configured to directly communicate with an individual server and/or the Internet. Server 118 may, for example, be or include a digital subscriber line (DSL) type modem. In at least one embodiment, one or both of APs 104, 108 include or function as a gateway.

In some embodiments, one or more of devices 112, 114, 116 may be referred stations (STAs), and the APs connected or associated therewith may operate according to a suitable communication protocol for Wi-Fi signaling in accordance with IEEE) 802.11 WLAN Medium Access Control (MAC) and Physical Layer (PHY) Specifications. The present embodiments may also be utilized in cooperation with non-Wi-Fi environments, and/or within environments configured to facilitate client steering between APs within a wireless network. In the example depicted in FIG. 1, APs 104, 108 may utilize the same network-defined SSID to facilitate wireless signaling optionally over multiple bands and/or channels within the same network. In other embodiments, one or more APs may use separate network-defined SSIDs. Signaling between individual APs of a wireless network is described in greater detail in co-pending U.S. application Ser. No. 16/133,621, filed Sep. 17, 2018, the entirety of which is incorporated by reference herein.

In exemplary operation, the first user downloads to primary Wi-Fi device 112 (or has stored in a memory thereof) a VPWN application, which includes instructions which may be executed by a processor (not shown) of the device. From this VPWN application, the user is enabled to create a user-defined SSID, which is different than the network-defined SSID, and at least one user-defined security key. The user-defined SSID and security key(s) may then be communicated (e.g., from primary Wi-Fi device 112 to first AP 104) to the Wi-Fi network operator, and thereby enable all of the users associated devices (e.g., secondary Wi-Fi devices 114)

to automatically connect with Wi-Fi network 100 using the unique user-defined security key created for the VPWN application.

In an operational embodiment, the VPWN application may be configured such that the first user pushes the user-defined SSID and user-defined security key(s) from primary Wi-Fi device 112 (e.g., an application on a Wi-Fi-enabled mobile phone) to server 118 (e.g., through first AP 104). Server 118 may then authenticate the user, and then enable the user-defined SSID and user-defined security key on the targeted Wi-Fi AP (first AP 104, in this example). The user-defined SSID and user-defined security key would thus be known by all of the first user's associated devices, namely, primary Wi-Fi device 112 and secondary Wi-Fi devices 114, and therefore all of these devices would be included within VPWN as a logical construct. Accordingly, when the respective Wi-Fi devices 112, 114 "see" the SSID, the devices are able to automatically connect to Wi-Fi network 100 without manual intervention by the user. That is, different from the conventional techniques that require each individual device to connect with each Wi-Fi network the present systems and methods enable all of a user's associated devices to "connect" once to their own virtual private Wi-Fi network/sub-network (e.g., VPWN 102), and then each individual device may automatically connect to every new network through the VPWN.

In some embodiments, the VPWN is configured to automatically connect to the Wi-Fi network without requiring manual input by the user. For example, a Wi-Fi network that supports the VPWN may be configured to recognize the VPWN, and not require a separate input password to access the Wi-Fi network. In other embodiments, a user may be prompted to submit the Wi-Fi network password once for the VPWN, and thus, a first Wi-Fi device of the user. Once entered for the VPWN to access the Wi-Fi network, however, the password (if needed) need not be entered for all secondary, associated devices of the same user.

One unique advantage achieved according to the present techniques is that the user-defined security key is unique to the particular user. Therefore, even if other users (e.g., non-associated client devices 116, in this example) are connected to or in communication with the same AP (e.g., first AP 104), the other users/client devices will not be able to decrypt the traffic from the associated user devices 112, 114 within the VPWN, since non-associated client devices 116 will not have the user-defined security key of the first user for VPWN 102. In an exemplary embodiment, all of the user's VPWN-associated Wi-Fi devices include a processor and a memory, and a VPWN application/executable instructions stored within the respective memory. In some embodiments, the VPWN application may be configured such that the associated Wi-Fi devices need only be capable of storing and retrieving the user-defined SSID and user-defined security key(s). In at least one embodiment, a VPWN application may be stored on a remote device or server, and push the user-defined SSID and security key(s) to individual selected Wi-Fi devices of the user.

In further exemplary operation, when server 118 identifies that none of the user's Wi-Fi devices 112, 114 are connected to first AP 104, the VPWN application may be further configured to cause server 118 to remove the user-defined SSID and user-defined security key(s) from first AP 104. In an alternative, or supplemental, embodiment, the VPWN application may be configured to instruct server 118 to remove the user-defined SSID and user-defined security key(s) from first AP 104 after the session has expired, or a predetermined duration. For ease of explanation, these examples are described with respect to interaction with a single AP. Nevertheless, the person of ordinary skill in the art will understand the applicability of these VPWN techniques with respect to multiple APs, such as in the case of switching between APs, bands, and/or channels, as described above.

Figure 2:
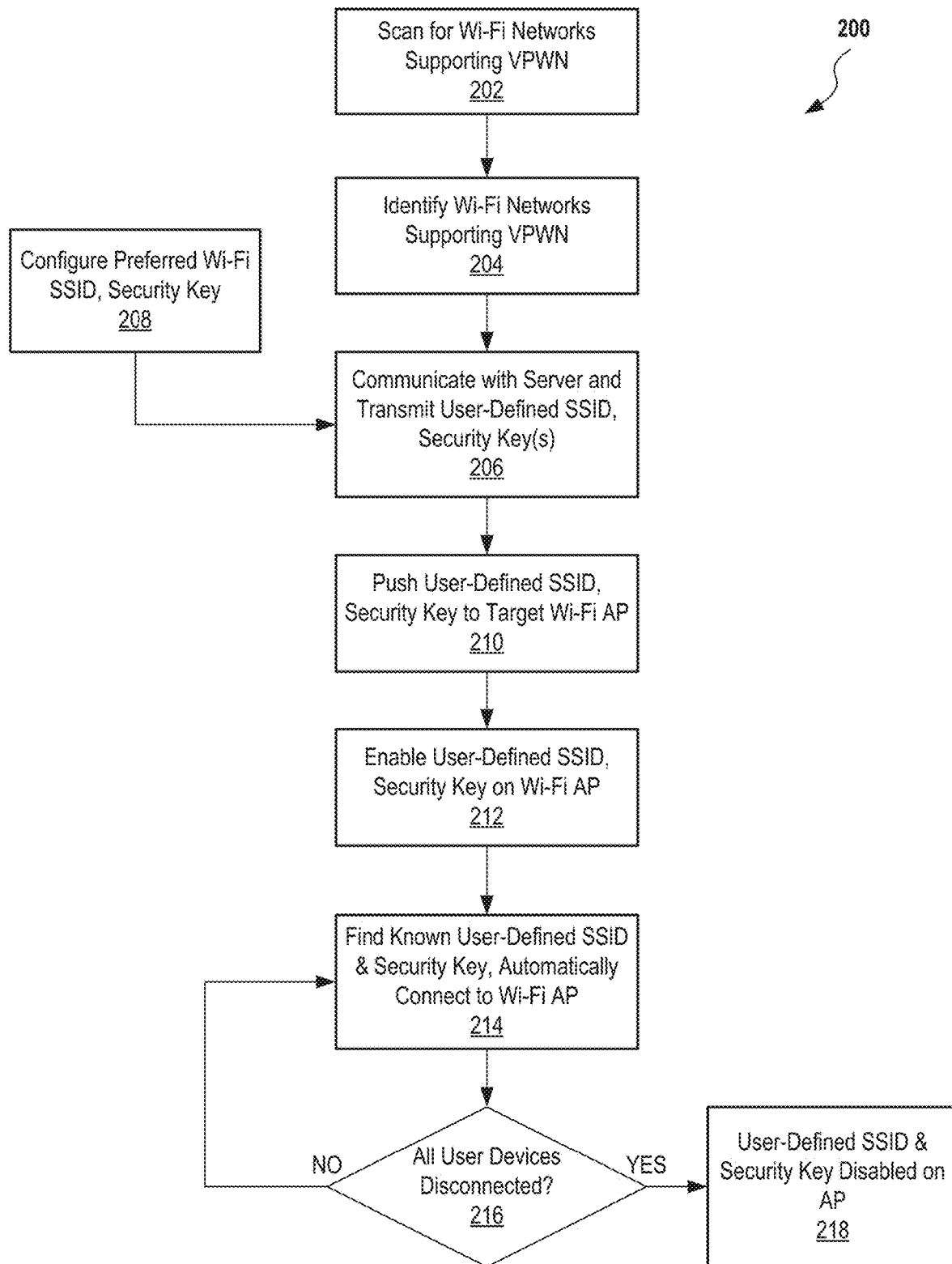
FIG. 2 is a flow diagram of a process for implementing the virtual private Wi-Fi sub-network depicted in FIG. 1.

FIG. 2 is a flow diagram of a process 200 for implementing a VPWN (e.g., VPWN 102), FIG. 1. The VPWN may be established, for example, according to an application stored in and executed by at least one Wi-Fi-enabled device (e.g., primary Wi-Fi device 112, FIG. 1) of a user. In exemplary operation, process 200 begins at step 202, in which the user Wi-Fi device is powered, turned on, or activated to wirelessly communicate with a wireless network (e.g., first AP 104 of wireless network 100, FIG. 1). In an exemplary embodiment of step 202, the Wi-Fi device scans for Wi-Fi networks that support the VPWN. That is, the VPWN application may be configured such that it may enable automatic connection and operation with essentially all conventional wireless networks. In at least one embodiment of step 202, the scanning step may be performed similarly to conventional Wi-Fi network scanning performed by a Wi-Fi-enabled device.

In step 204, process 200 identifies Wi-Fi networks that support the VPWN. In an exemplary embodiment of step 204, the VPWN application automatically selects a supporting Wi-Fi network according to one or more selection criteria (e.g., signal strength, traffic congestion, security protocols, etc.). In an alternative embodiment of step 204, the VPWN application is configured to display available supporting Wi-Fi networks to the user on an interface of the user device. In step 206, process 200 communicates with the server (e.g., server 118, FIG. 1) of a selected one of the identified supporting Wi-Fi networks, and transmits the user-defined SSID and at least one user-defined security key to the server for authorization of the VPWN on the Wi-Fi network.

In step 208, the user configures (e.g., through the VPWN application) a preferred user-defined SSID and at least one user-defined security key. In an exemplary embodiment of step 208, the user-defined SSID and user-defined security key(s) are configured by the user and stored on the particular Wi-Fi device prior to execution of process 200. In an alternative embodiment of step 208, in the case where the user-defined SSID and user-defined security key have not yet been configured by the user, process 200 may be further configured to prompt the user (e.g., on a display of the particular primary Wi-Fi device) to complete step 208 prior to the execution of step 206.

Upon completion of step 206, process 200 proceeds to step 210, in which the VPWN receives an authentication from the server, that is, the user of the VPWN is authorized on a server, and process 200 (e.g., the VPWN application) then instructs the server to push the received user-defined SSID and user-defined security key to the target Wi-Fi AP (first AP 104, in this example). In step 212, the server is further instructed to enable the user defined SSID and user-defined security key on the target Wi-Fi AP. In an exemplary embodiment of step 212, the user-defined SSID and user-defined security key are temporarily stored in the memory of the target Wi-Fi AP. In step 214, at least one Wi-Fi-enabled device of the user finds and recognizes the user-defined SSID and user-defined security key on the target Wi-Fi AP and automatically connects to that Wi-Fi AP in a secure connection that other users of that Wi-Fi AP are unable to detect or decrypt the communications therewith.

Step 216 is a decision step. If, in step 216, process 200 determines that all user devices are disconnected from the target Wi-Fi AP, process 200 proceeds to step 218, in which the user-defined SSID and the user-defined security key(s) are disabled on the target Wi-Fi AP (or on a different AP, such as a second AP 108, in the case where communication traffic has been diverted between APs). If, however, in step 216, process 200 determines that at least one associated user device is still connected to a target Wi-Fi AP, process 200 returns to step 214, and repeats this sub-loop until all associated user devices are disconnected from the target Wi-Fi AP and/or the selected Wi-Fi network. In an alternative embodiment, process 200 proceeds directly from step 214 to step 218 at the end of a session, or upon a lapse of a predetermined duration.

According to the exemplary systems and methods described herein, the user is able to create his or her own virtual private wireless network/sub-network that includes all Wi-Fi devices selected by the user, but excludes other Wi-Fi devices from detecting the virtual private wireless network or decrypting the traffic thereof. The user need only connect the user's various devices once with the virtual private wireless network (e.g., using a relevant application configured therefor), and the virtual private wireless network then functions to automatically connect with any new wireless network encountered by any one of the users devices that are configured with in the virtual private wireless network.

The virtual private wireless network is maintained for the user by the creation of a user-defined SSID that should not be discoverable by unauthorized, non-associated users, and a security key that provides an additional layer of security to the user. That is, the user-defined security key encrypts the user's traffic with a target AP such that other unauthorized users may not decrypt the first user's traffic without the key. According to the present embodiments, the false sense of security associated with "secure" conventional Wi-Fi networks is resolved, and the cumbersome conventional process of connecting each associated device of the same user is avoided.

Exemplary embodiments of systems and methods for virtual private wireless networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, such is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including the make and use of devices or systems, and performance of incorporated methods. The patentable scope of the disclosure is defined by the claims, and may include other examples that occur to skilled artisans. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of implementing a virtual private wireless network (VPWN) within a wireless communication network, the method implemented by a first Wi-Fi-enabled device having a processor and memory, the method comprising the steps of:
storing a user-defined service set identifier (SSID) and a user-defined security key in the memory;
scanning for one or more wireless networks that support of the VPWN;
identifying the wireless communication network from among the one or more wireless networks;
transmitting the user-defined SSID and the user-defined security key to the wireless communication network;
instructing the wireless network to enable the user-defined SSID and the user-defined security key at a target access point (AP) configured to wirelessly communicate according to a communication protocol of the first Wi-Fi-enabled device;
pushing the user-defined SSID and the user-defined security key to a second Wi-Fi-enabled device associated with a user of the first Wi-Fi-enabled device; and
authorizing the second Wi-Fi-enabled device to automatically discover the user-defined SSID and the user-defined security key enabled at the target AP.

2. The method of claim 1, wherein the step of storing comprises a substep of configuring a preferred SSID and a preferred security key as the user-defined SSID and the user-defined security key, respectively.

3. The method of claim 2, wherein the substep of configuring is executed before the step of scanning.

4. The method of claim 2, wherein the substep of configuring is executed after the step of scanning, but before the step of transmitting.

5. The method of claim 1, further comprising, after the step of authorizing, the step of automatically connecting the second Wi-Fi-enabled device to the target AP upon discovery of the user-defined SSID and the user-defined security key at the target AP.

6. The method of claim 1, wherein the step of instructing comprises a substep of disabling the user-defined SSID and the user-defined security key on the target AP when the first and second Wi-Fi-enabled devices are disconnected from the target AP.

7. The method of claim 1, wherein the step of instructing comprises a substep of disabling the user-defined SSID and the user-defined security key on the target AP after a predetermined duration.

\* \* \* \* \*